United States Patent [19]

Chen et al.

[11] Patent Number: 4,521,578

[45] Date of Patent: Jun. 4, 1985

[54] COMPOSITION AND METHOD OF PREPARATION OF NOVEL AQUEOUS DRILLING FLUID ADDITIVES

[75] Inventors: Robert G. Chen; Arvind D. Patel; Thomas E. Sample, Jr., all of Houston, Tex.

[73] Assignee: Dresser Industries, Inc., Dallas, Tex.

[21] Appl. No.: 536,464

[22] Filed: Sep. 26, 1983

[51] Int. Cl.³ .................... C08F 12/30; C08F 4/06; C08F 4/46

[52] U.S. Cl. .................... 526/288; 252/8.5 C; 526/94; 526/123; 526/180

[58] Field of Search .................. 526/288, 123, 180, 94

[56] References Cited

U.S. PATENT DOCUMENTS

| | | | |
|---|---|---|---|
| 2,209,289 | 7/1940 | Wallace | 260/2 |
| 2,477,157 | 7/1949 | Wayne | 252/8.5 |
| 2,552,775 | 3/1948 | Fischer et al. | 252/8.5 |
| 2,704,277 | 3/1955 | Giammaria | 252/56 |
| 2,911,365 | 11/1959 | Burland et al. | 252/8.5 |
| 2,935,473 | 5/1960 | King et al. | 252/8.5 |
| 3,108,956 | 10/1963 | Dever et al. | 252/8.5 |
| 3,332,904 | 7/1967 | Le Combe et al. | 526/288 |
| 3,347,788 | 10/1967 | Sohn | 252/8.5 |
| 3,434,970 | 3/1969 | Siegele et al. | 252/8.5 |
| 3,537,992 | 11/1970 | Kolaian | 252/8.5 |
| 3,546,199 | 12/1970 | Christian et al. | 260/124 |
| 3,730,900 | 5/1973 | Perricone et al. | 252/8.5 C |
| 3,764,530 | 10/1973 | Burland et al. | 252/8.5 C |
| 3,768,565 | 10/1973 | Persinski et al. | 166/308 |
| 3,879,298 | 4/1975 | Walker | 252/8.5 C |
| 3,879,299 | 4/1975 | Walker | 252/8.5 B |
| 3,907,927 | 9/1975 | Guilbault | 260/875 |
| 3,953,342 | 4/1976 | Martin et al. | 252/8.55 D |
| 4,357,245 | 11/1982 | Engelhardt et al. | 252/8.5 C |
| 4,374,738 | 2/1983 | Kelley | 252/8.5 |

FOREIGN PATENT DOCUMENTS 2444108 9/1974 Fed. Rep. of Germany .
2502012 7/1975 Fed. Rep. of Germany .
2547773 4/1976 Fed. Rep. of Germany .

OTHER PUBLICATIONS

Chen, R. et al., "Graft Copolymerization of Lignosulfonate and Styrene", *Journal of Applied Polymer Science*, 24, (1979).

Chen, R. et al., "Study of the Graft Copolymerization of Lignosulfonate and Acrylic Monomers", *Journal of Applied Polymer Science*, 25, (1980).

Gray, George R. et al., *Composition and Properties of Oil Well Drilling Fluids*, (Aug. 1981).

Chesser, B. G., et al., "High Temperature Stabilization of Drilling Fluids with a Low-Molecular-Weight Copolymer", *Journal of Petroleum Technology*, (Jun. 1980).

Kutner, A. et al., "Sodium Ethylenesulfonate-N-Vinylpyrrolidine Copolymers", *Journal of Polymer Science*, 38, 274, (1959).

*Primary Examiner*—Herbert S. Cockeram
*Attorney, Agent, or Firm*—Arnold, White & Durkee

[57] ABSTRACT

The present invention relates to new compositions and methods of preparation of deflocculents for water-base mud additives. The disclosed materials are low molecular weight terpolymers and graft copolymers consisting essentially of monovalent salts of (1) 5 to 50% by weight of tetrahydrophthalic acid (THPA); (2) 10 to 70% by weight of acrylic acid (AA); (3) 5 to 50% by weight of 2-acrylamido-2-methylpropane sulfonic acid (AMPS); and (4) 0 to 70% by weight of lignosulfonate units. The unique compositions and processes of terpolymers and graft copolymers provide excellent drilling fluid additives which significantly control the viscosity, yield point, gel strength, and fluid loss of drilling fluids over a wide range of temperatures and in the presence of contaminants such as salt, lime, cement, gypsum and drilled solids.

27 Claims, 6 Drawing Figures

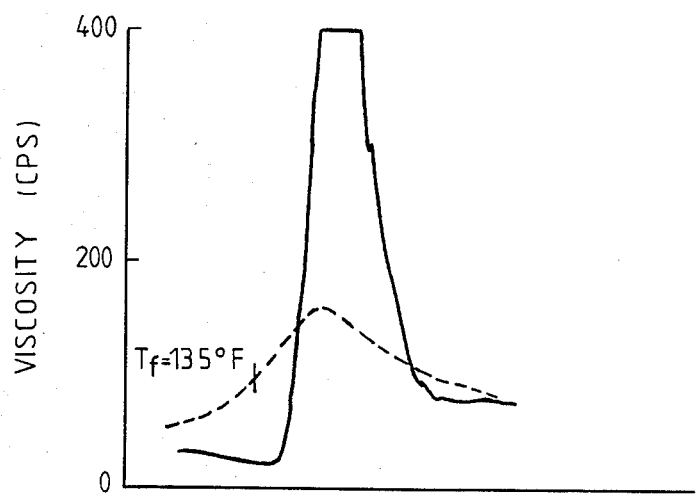
FIGURE I
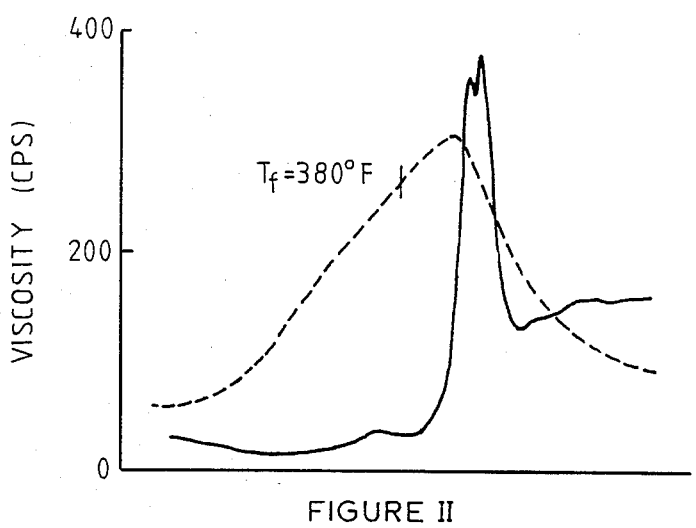
FIGURE II

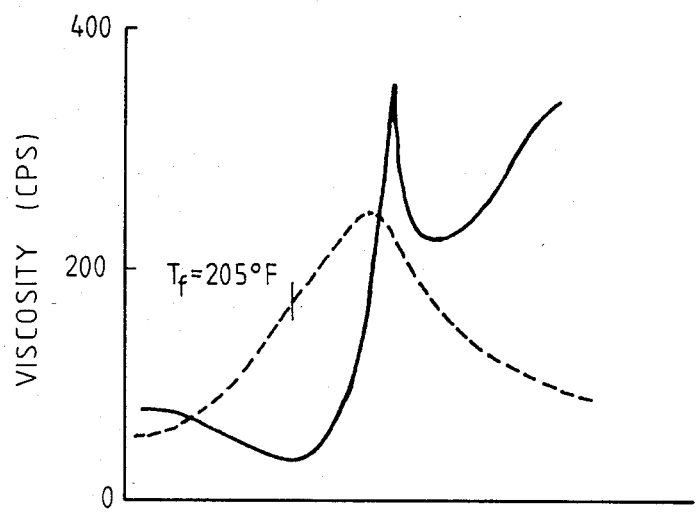
FIGURE III
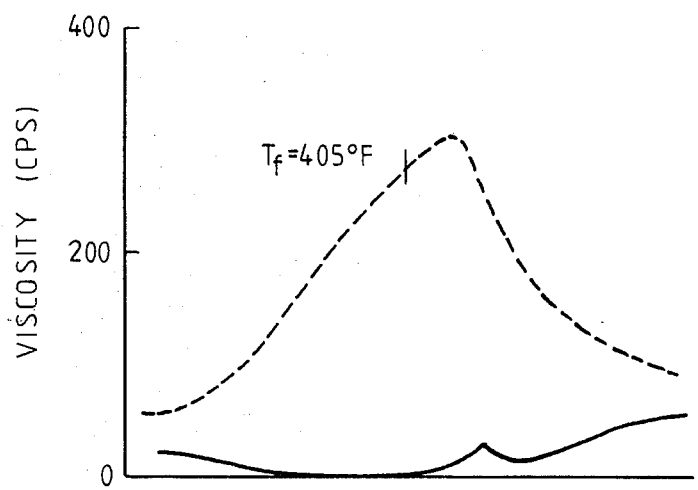
FIGURE IV

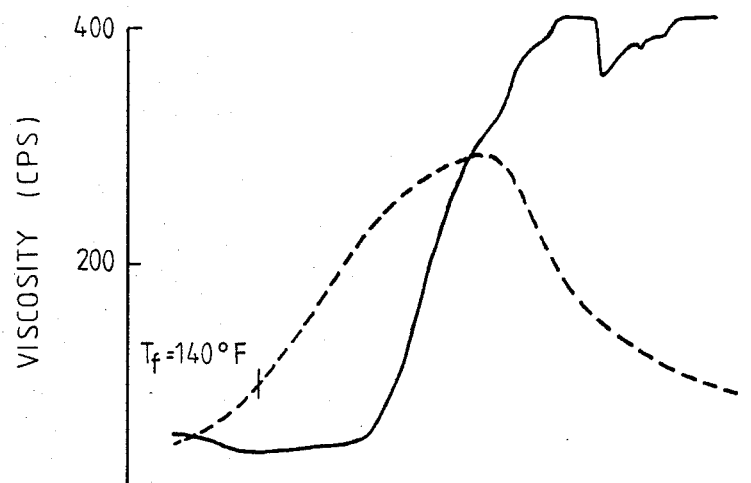
FIGURE V
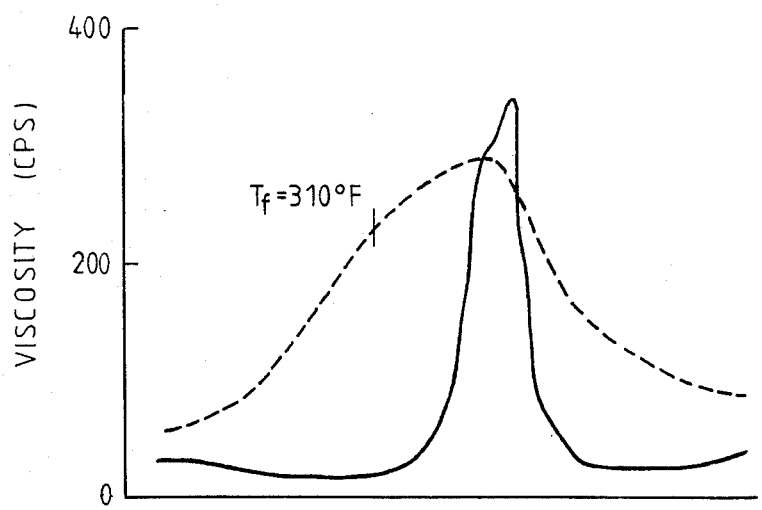
FIGURE VI

4,521,578

COMPOSITION AND METHOD OF PREPARATION OF NOVEL AQUEOUS DRILLING FLUID ADDITIVES

FIELD OF THE INVENTION

This invention relates to the novel compositions and methods of preparation of deflocculants for aqueous drilling fluid additives. A general problem has been recognized in that commercially available additives to drilling fluids have demonstrated unsatisfactory thermal stability. The effect of thermal instability is a severe decrease in the functional characteristics of the drilling fluid system.

In formulating a polymer for use as a drilling fluid additive, it is necessary to consider the desired functional characteristics of the drilling fluid. Specifically, the viscosity, gel strength, filtrate loss and contamination control characteristics of the drilling fluid must be maintained within acceptable ranges.

Various water soluble polymers have been synthesized or otherwise developed, and certain polymers are known to occur naturally, some of which have shown at least a limited ability to control the viscosity, gel strength, and filtrate loss of aqueous drilling fluids. However, the thermal stability of these materials has been unacceptable, making their use in drilling activities of limited value. During the drilling of certain deep wells, i.e., in excess of fifteen thousand feet, or in geographic areas of high geothermal activity, the viscosity, gel strength and fluid loss of the drilling fluid are adversely effected as a function of temperature such that the noted performance characteristics are not within acceptable ranges.

The drilling fluid itself is an essential item in the oil well drilling system. In particular, in rotary well drilling, the principal functions performed by the drilling fluid are to carry cuttings from beneath the drill bit, transport the cuttings from the annulus and permit their separation at the surface. The drilling fluid, or drilling mud as it is more typically called, also cools and cleans the drill bit, reduces friction between the drill string and sides of the drill hole and maintains the stability of uncased sections of the borehole.

It is essential that the drilling fluid formulation be such that it will prevent the inflow of fluids, such as oil, gas or water, from the permeable rock formations which have been penetrated or which are being penetrated.

The drilling fluid should also contain additives which permit the formation of a thin, low permeability filter cake which seals pores and other openings in the formations which are penetrated by the bit. Finally, the drilling mud must assist in the collection and interpretation of information available from drill cuttings, cores, and electrical logs.

There are certain limitations which are placed on the formulation of drilling muds for actual commercial use. The drilling fluids must be formulated such that they are not injurious to the drilling personnel and not damaging or offensive to the environment. The drilling fluids must not cause unusual or expensive methods of completion of the drilled hole nor interfere with normal productivity of the fluid bearing formation. Finally, it is essential that the drilling fluid not corrode or cause excessive wear to drilling equipment. From these requirements has arisen the need for specialized drilling additives which will assist the drilling mud formulation in the performance of these various functions.

The effectiveness of a drilling fluid and in particular the additives found in the drilling fluid are evaluated by measurement of certain characteristics of the drilling system. The viscosity, gel strength, filtrate loss, contamination control and tolerance to divalent ion characteristics of drilling fluids and drilling systems are all directly attributable to the drilling fluid or drilling mud. These properties, their definitions and a general explanation is found in a comprehensive treatise entitled *Composition and Properties of Oil Well Drilling Fluids*, 4th Ed., George R. Gray and H. C. H. Darley, Gulf Publishing Company, (1980).

An essential characteristic of drilling fluids which is controlled by the additive of this invention is viscosity. The viscosity of drilling fluids is very difficult to control because of the adverse conditions under which drilling fluids are used as well as the excessively elevated temperatures to which they will be exposed. In this regard, during the drilling of certain deep wells, i.e., greater than 15,000 feet, it is common for the drilling fluid to be exposed to temperatures at which thermal decomposition of certain additives occurs. These temperatures can easily cause a severe change in the viscosity of the drilling fluid and thus adversely affect the flow characteristics of the drilling mud and adversely affect the overall drilling operation. Such viscosity modification at these temperatures is not acceptable in normal drilling fluids. Additionally, certain areas of the country have excessive geothermal activity resulting in extremely high temperatures. The same effect can be had on drilling fluids at these geothermally elevated temperatures as in deep wells. In any event it is necessary that the apparent viscosity of the drilling fluid be controlled within desired ranges, which are in many instances dependent on the geographic area of activity. The apparent viscosity is a function of plastic viscosity and yield point. As a general rule, as the mud weight increases, the plastic viscosity increases, but the yield point is allowed to increase by a much smaller magnitude.

A second essential characteristic is the gel strength of the drilling fluid. Gel strength is a characteristic of the drilling fluid which reflects the ability of the drilling fluid to maintain a suspension of additives and drill cuttings, especially when circulation is stopped. As can be appreciated, if circulation of the drilling fluid is terminated, and if all of the suspended cuttings and additives to the drilling fluid were then permitted to settle to the lowest point an intolerable situation would be encountered and in all likelihood the drill string would be broken and the bit lost.

If the drilling fluid gel strength is too low, it is typically increased by adding bentonite. Ideally, the drilling fluid gel strength should be just high enough to suspend barite and drill cuttings when circulation is stopped. Higher drilling fluid gel strengths are undesirable because they retard the separation of cuttings and of entrained gas at the surface, and also because they raise the pressure required to reestablish circulation after changing bits. Furthermore, when pulling pipe, a high gel strength may reduce the pressure of the mud column beneath the bit because of a swabbing action. If the reduction in pressure exceeds the differential pressure between the mud and the formation fluids, the fluids will enter the hole, and possibly cause a blowout. Similarly, when running pipe into the hole, the downward motion of the pipe causes a pressure surge which may, when conditions are critical, cause induced fracturing with consequent loss of circulation. Methods have been developed for calculation of the magnitude of these pressure surges.

Related to the gel strength control is the ability of the drilling fluid to tolerate divalent ions. Typically, thinners are used to reduce the gel strength of fresh water or low salinity muds. The use of some types of such thinners has an unfortunate secondary effect, i.e., the replacement of calcium or other polyvalent cations on clay cuttings by the sodium used to solubilize these particular thinners. This tends to disperse the clay into small particles, some of which are not removed at the surface, and are again recycled until they are reduced to colloidal size. This action makes the control of viscosity very difficult and expensive when drilling through colloidal clay formations with a fresh water mud (drilling fluid). The dispersive effect of the sodium ion may be offset by the addition of a calcium compound or else by the use of a polymer brine mud. The drilling fluid additive of this invention displays a high tolerance to divalent ions.

Another essential function of the drilling fluid is its ability to seal permeable formations exposed by the bit with a thin low permeability filter cake. In order for a filter cake to form it is essential that the drilling fluid contain particles of a size only slightly smaller than that of the pore openings of the formation. These particles are trapped in the surface pores while finer particles are carried deeper into the formation. The particles which are deposited on the formation are known as the filter cake.

It is essential to control the permeability of the filter cake. This permeability depends on the particle size distribution of solids suspended in the drilling fluid and on electrochemical conditions. In general, the more particles there are in the colloidal size range, the lower the cake permeability. The pressence of soluble salts in clay bearing muds increases the permeability of the filter cake sharply. Filtration performance in the well is routinely judged by means of the standard American Petroleum Institute filtration test. In this test, the mud is subjected to static filtration through filter paper for thirty minutes, and the volume of filtrate and the cake thickness are then measured. Within any specific drilling fluid and drilling system it is necessary to carefully control the filtrate loss within predesigned tolerance ranges. These tolerance ranges will vary from geographic area to geographic area depending on the type of formations encountered.

During drilling operations, it is always anticipated that the drilling fluid will be contaminated with various materials. Some of the potential contaminants are damaging to the ionic balance and viscosity properties of the drilling fluid. These impurities include sodium chloride and gypsum as well as other minerals and the like.

THE PRIOR ART

Acrylic acid homopolymers having a molecular weight in the range of 5,000 to 50,000 disclosed in U.S. Pat. No. 2,552,775 have been utilized as deflocculants or dispersants in water-base muds. Also, U.S. Pat. No. 2,911,365 teaches the use of acrylic telomers as deflocculants in aqueous drilling fluids. Additionally, the utilization of low molecular weight alkali metal or ammonium salts of polyacrylic acid as deflocculants is disclosed in U.S. Pat. No. 3,764,530. Acrylic acid-acrylamide random copolymers, partially hydrolyzed polyacrylamides and polyacrylonitriles, which are flocculants at high molecular weight show different properties and perform as deflocculants at low molecular weight. Examples are disclosed in U.S. Pat. No. 3,434,970.

It is generally recognized that low molecular weight polyacrylic acid and its salts show promising properties as high temperature deflocculants only in uncontaminated and low-clay-solid water-base muds. These types of polymers, however, are too sensitive to divalent ion contaminants, such as calcium and magnesium ions, and only marginally effective in high-clay-solid muds.

The syntheses of water-soluble polymers containing sulfonic acid moieties have been described in detail in many publications. For example, the syntheses of copolymers of vinylsulfonic acid with acrylamide and vinylpyrrolidone have been published in J. Polym. Sci., 38, 174 (1959), and extensive works on homopolymers and copolymers of 2-acrylamido-2-methylpropane sulfonic acid are disclosed in U.S. Pat. Nos. 3,933,342; 3,768,565; 3,907,927 and 4,357,245. A composition and process for the drilling of subterranean wells utilizing a low molecular weight styrene sulfonic acid-maleic anhydride copolymer as a colloidal stabilizer for aqueous drilling fluids is described in U.S. Pat. No. 3,730,900. The commercial product is marketed by Milchem Inc. under the trade name MIL-TEMP.

Lignin, as it occurs in woody plants, is a three-dimensional molecule consisting of rather hydrophobic phenylpropane units. Lignosulfonates are by-products of the pulp and paper industries through the sulfite process for making pulp. Modified lignosulfonates have been used in the past as deflocculants for water-base muds. The use of certain metal salts of lignosulfonates are disclosed in U.S. Pat. Nos. 2,935,473 and 3,347,788 wherein the metals are chromium, aluminum, iron, copper, or a combination thereof, which salts may or may not be oxidized. These modified lignosulfonates show promising properties in uncontaminated water-base muds at temperature below 320° F. The grafting of acrylic acid onto lignosulfonate is disclosed in U.S. Pat. No. 4,374,738. Again, as pointed out by the inventors these drilling fluid additives are too sensitive to divalent ion contaminants.

A related patent application is "Thermally Stable Drilling Fluid Additive," U.S. Ser. No. 501,900 by A. D. Patel, filed on June 7, 1983. This application discloses a thermally stable drilling fluid additive comprising a catechol based monomer. It is incorporated herein by reference.

Therefore, it is an object of the present invention to provide drilling fluid additives which will effectively control the viscosity, gel strength, yield point, and fluid loss characteristics of aqueous drilling fluids over a wide range of temperatures encountered during drilling operations.

It is an additional object of the present invention to provide drilling fluid additives which will effectively control the viscosity, gel strength, yield point, and fluid loss characteristics of contaminated aqueous drilling fluids. Examples of the contaminants encountered during drilling operations are sodium chloride and gypsum.

It is a further object of the present invention to provide a drilling fluid additive which will effectively control the viscosity, gel strength, yield point, and fluid loss characteristics of aqueous drilling fluids which have had their densities increased by the drilled solids.

These and other objects of the present invention will become apparent from the detailed description of the invention.

SUMMARY OF THE INVENTION

The present invention relates to novel compositions and methods of preparation of deflocculants for water-base mud additives. The disclosed materials are low molecular weight terpolymers and graft copolymers consisting essentially of monovalent and/or divalent salts of (1) 5 to 50% by weight of tetrahydrophthalic acid (THPA); (2) 10 to 70% by weight of acrylic acid (AA); (3) 5 to 50% by weight of 2-acrylamido-2-methylpropane sulfonic acid (AMPS); and (4) 0 to 70% by weight of lignosulfonate units. The unique compositions and processes of terpolymers and graft copolymers provide excellent drilling fluid additives which significantly control the viscosity, yield point, gel strength, and fluid loss of drilling fluids over a wide range of temperatures and in the presence of contaminants such as salt, lime, cement, gypsum, and drilled solids.

BRIEF DESCRIPTION OF THE DRAWINGS

FIGS. I through VI are each graphic representations of evaluations of drilling mud rheology in which the viscosity of a drilling mud is plotted as a function of time and temperature.

DETAILED DESCRIPTION OF THE INVENTION

The control of molecular weight is one of the most important parameters in the preparation of polymeric deflocculants for water-base muds. For example, high molecular weight polyacrylic acid is used as a thickener for water-base muds; however, low molecular weight polyacrylic acid is used as a deflocculant. The control of molecular weight can be achieved through the regulation of reaction temperatures, starting materials, i.e. monomer and initiator concentrations, or through the use of "scavengers", such as mercaptans, or through the introduction of functional monomers which exhibit high chain transfer capability.

Formula I represents monovalent salt of tetrahydrophthalic acid (THPA), where M+ is a bonded monovalent cation. Salts of THPA exhibit high chain transfer constant through allylic resonance during a free-radical polymerization. Thus, the molecular weights of THPA containing polymers are limited. Also, salts of THPA which exhibit chelating capability are excellent divalent cation stabilizers. Additionally, salts of THPA units enhance the adsorption between polymers and clay particles, and reduce flow resistance and gel development.

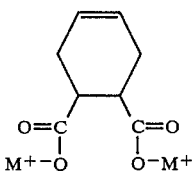

FORMULA I

In the present invention, it is essential to introduce a monovalent salt of THPA monomer in the preparations of low molecular weight terpolymers and graft copolymers. The use of a salt of THPA offers the following advantages: (1) molecular weight regulation; (2) divalent cation stabilization; (3) thermal stability enhancement; and during use (4) reduces the gel development of the drilling fluid. Monovalent salts of itaconic acid may be used in the present invention; however, the divalent cation stabilization capability is inferior to that of THPA units.

The concentration of the monovalent salt of THPA presented in the invention varies from 5% to 50% by weight depending on the end use and drilling environments encountered during drilling operations.

A second monomer is used in the present invention to enhance anionic charge density of the resulting polymers. This second monomer is selected from the monovalent salts of acrylic acid, methacrylic acid, and partially hydrolyzed acrylamide and acrylonitrile. Carboxylic acid units present in the polymer backbone provide promising properties in uncontaminated water-base mud at lower temperature range.

The monovalent salt of 2-acrylamido-2-methylpropane sulfonic acid (referred to herein as AMPS, a registered trademark of Lubrizol, Inc.) is also utilized in the present invention. The structure is illustrated in Formula II, where M+ represents a cation. The AMPS containing polymers exhibit satisfactory ion stability, this is attributed to the exceptionally large ionization constant and hydrogen bonding capability of AMPS units. Functionally, the AMPS units also provide fluid loss control capability. Monovalent salts of vinylsulfonic acid and 2-sulfoethyl methacrylate are also used in the present invention. The concentration of the monovalent salt of AMPS presented in the invention may vary from 5% to 50% by weight of the materials.

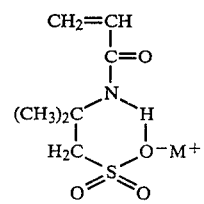

FORMULA II

Lignosulfonate has high utility in the preparation of graft copolymers in the present invention. It is an exceptionally inexpensive sulfonated material. Lignosulfonate contains hydroxy phenylpropane units. Functionally, these units provide grafting sites where graft copolymerization can proceed in the presence of a free-radical initiator. Hydroxy phenylpropane units also serve to regulate the molecular weight of the resulting graft copolymers through chain transfer mechanisms of the units.

Although lignosulfonates in general are useful in the process and product of this invention the salts of lignosulfonates and specifically the potassium, calcium, ammonium, sodium salts or combinations thereof are preferred. Even more preferred are the lignosulfonates which have been complexed with transition metals. The transition metals which are useful in the lignosulfonate complexing reaction are titanium, zirconium, chromium, iron, nickel, zinc, copper and combinations thereof.

The advantages of utilizing lignosulfonate in the preparations of graft copolymers in this invention includes: (1) enhancement in sulfonate functionality; (2) molecular weight regulation; and (3) substantial cost reduction.

Preferred terpolymers and graft copolymers, according to the present invention, are obtained by the proper formulations of 5 to 50 parts by weight of a monovalent salt of tetrahydrophthalic acid, 10 to 70 parts by weight of a monovalent salt of acrylic acid, 5 to 50 parts by weight of a monovalent salt of 2-acrylamido-2-methylpropane sulfonic acid, and 0 to 70 parts by weight of lignosulfonate in the preparation of 100 parts by weight of terpolymers and graft copolymers.

A variety of polymerization techniques, such as solution, precipitation, and inverse emulsion polymerizations may be employed in practicing the present invention.

In solution polymerization, water is used as the reaction medium. After polymerization at elevated temperature, the resulting polymer is spray dried.

In precipitation polymerization, the monomer is soluble in the reaction medium but the resulting polymer is not. The medium thus never gets very viscous and the polymer is relatively easy to isolate and dry. The reaction medium used is a 40-60% solution of methanol in water.

In inverse emulsion polymerization, the monomer is present in concentrated aqueous solution dispersed in an organic medium in the form of small droplets. A surface-active stabilizer, such as sorbitan monooleate, may be used to prevent coagulation of the emulsion.

Thermal initiators are used in the present invention. The initiators utilized may be either water soluble or oil soluble, depending on the reaction medium chosen. Examples of free-radical initiators used are peroxides, persulfates, or azo compounds. As a general rule, 2 to 15 parts by weight of initiator are used in the preparation of 100 parts of terpolymers and graft copolymers. It is most desirable to maintain the molecular weight of the terpolymers and graft copolymers below 50,000.

The control of monomer sequence distribution, microstructure, and grafting efficiency are essential to the preparation of terpolymers and graft copolymers, since these parameters dominate the performance of the end products. These parameters are functions of reaction medium and temperature. The preferred reaction medium according to this invention, is an aqueous solution with a pH value in the range of 7 to 12. Sodium hydroxide, potassium hydroxide, and ammonium hydroxide are the preferred bases used to adjust the pH value of the reaction medium. The polymerization temperature is between 40° C. and 90° C.; and is preferably 60° C. to 90° C.

The mixing of reaction components and the feeding of monomers into reaction medium are also essential parameters to the processing of graft copolymers because the grafting efficiency is affected by these parameters. The mixing of reaction components may proceed by the simple preparation of a solution of all the designated amounts of reaction components. An alternative method involves first preparing a solution of the designated amount of lignosulfonate substrate and initiator followed by the feeding of monomers and comonomers into the reaction solution. The feeding of monomers and comonomers thereto is at a controlled rate into the "monomer hungry" bed of lignosulfonate. Thus, the grafting efficiency is enhanced by this process.

The terpolymers and graft copolymers prepared in accordance with the present invention are exceptionally effective drilling fluid additives. These materials have a synergistic effect in providing colloidal stability, reducing viscosity, gel strength and filtrate loss. The performance and effectiveness of these polymers in aqueous drilling fluids, which are subjected to elevated temperature for extended periods of time, are greatly superior to the next level of comparable aqueous drilling fluid additives which are described in the patent literature and other publications. The superiority of the terpolymers and graft copolymers of this invention is described in the attached working examples.

EXAMPLE I

Terpolymers of sulfonated and carboxylated monomers were prepared in aqueous solution using ammonium persulfate as the initiator. The pH values of the reaction media were adjusted by sodium hydroxide. Table I lists reaction parameters for two reactions in which the ratios of monomers in the feed were varied. Each reaction was conducted in a three-necked flask equipped with a mechanical stirrer, a condenser, and nitrogen line. Mixtures of designated amounts of sulfonated and carboxylated monomers and comonomers were prepared and dissolved in aqueous reaction media. Each reaction mixture was then deaerated with nitrogen for 15 minutes. The designated quantity of ammonium persulfate initiator was introduced into the reaction vessel. After three hours of polymerization at elevated temperature, the resulting terpolymer was spray dried.

TABLE I

| | Wt. % | | | | |
|---|---|---|---|---|---|
| Sample | THPA[1] | AA[2] | AM[3] | AMPS[4] | $(NH_4)_2 S_2O_8$ |
| 1 | 20 | 42 | — | 21 | 15 |
| 2 | 45 | — | 19 | 24 | 12 |

[1]THPA: Tetrahydrophthalic acid.
[2]AA: Acrylic acid.
[3]AM: Acrylamide.
[4]AMPS: 2-acrylamido-2-methylpropane sulfonic acid.

The effectiveness of these samples, which are prepared in accordance with the present invention, along with a commercial sample, TDL, were evaluated in 12 pounds per gallon water-base mud containing bentonite and barite. The TDL sample is a low molecular weight polyacrylate marketed by Dresser Industries. In each test, the mud was contaminated with 4 pounds per barrel of gypsum and was treated with 3 pounds per barrel of polymer sample and 6 pounds per barrel of chromium lignosulfonate. The treated mud samples were aged for 16 hours in a rotating oven at the temperature indicated. Following the testing methods specified by the American Petroleum Institute, the evaluation data were obtained and listed in Table II. This table clearly indicates that the gel strengths and fluid losses of Samples 1 and 2 treated mud systems are substantially reduced when compared to that of the base mud and the TDL treated system.

TABLE II

| Sample | °F. | 10 Min. Gel. (lb/ft.$^2$) | A.P.I. F.L. (C.C.) |
|---|---|---|---|
| Chromium ligno-sulfonate base mud | 200 | 3 | — |
| | 350 | 39 | 12.2 |
| | 425 | Too thick to measure | |
| TDL[1] | 200 | 22 | — |
| | 400 | 30 | 11.3 |
| 1 | 200 | 2 | — |
| | 400 | 1 | — |
| | 425 | 8 | 9.8 |
| 2 | 20 | 2 | — |

TABLE II-continued

| Sample | °F. | 10 Min. Gel. (lb/ft.²) | A.P.I. F.L. (C.C.) |
|---|---|---|---|
| | 400 | 2 | — |
| | 425 | 4 | 10 |

(1)TDL: A low molecular weight polyacrylate marketed by Dresser Industries.

The rheological behavior of these systems is also evaluated by a Model 50C Viscometer. The viscosity-temperature relationships for TDL and Sample 1 were demonstrated in FIGS. I and II. The viscosity and temperature profiles were illustrated by solid and dot lines, respectively. FIG. 1 indicates a dramatic viscosity increase with temperature for the TDL treated mud; this is not desirable. The flocculating temperatures for TDL and Sample 1 treated muds are 135° F. and 380° F., respectively. The higher flocculation temperature is more desirable. This demonstrates that terpolymers prepared in accordance with the present invention exhibit much better thermal stability than TDL.

EXAMPLE II

Reaction parameters for the grafting acrylic acid (Sample 3) and for the co-grafting of monovalent salts of tetrahydrophthalic acid, acrylic acid, and 2-acrylamido-2-methylpropane sulfonic acid (Sample 4) onto lignosulfonate substrates are listed in Table III. Sample 3 was prepared in accordance with the teaching of U.S. Pat. No. 4,374,738 and Sample 4 was prepared following the present invention.

TABLE III

| Sample | Wt. % | | | |
|---|---|---|---|---|
| | AA(1) | THPA(2) | AMPS(3) | LS(4) |
| 3 | 25 | — | — | 75 |
| 4 | 33 | 23 | 24 | 20 |

(1)AA: Acrylic acid.
(2)THPA: Tetrahydrophthalic acid.
(3)AMPS: 2-acrylamido-2-methylpropane sulfonic acid.
(4)LS: Lignosulfonate.

The evaluation procedures were identical to those described in Example I. The evaluation data are listed in Table IV. The viscosity-temperature relationships for these two mud systems are demonstrated in FIGS. III and IV. The flocculating temperatures for Sample 3 and Sample 4 are 205° F. and 415° F., respectively. FIG. III shows a dramatic viscosity increase with temperature for Sample 3 treated mud. However, the viscosity for Sample 4 treated mud is relatively unaffected by heating and cooling, which is the temperature cycle during a drilling operation.

TABLE IV

| Sample | °F. | 10 Min. Gel. (lb/ft.²) | A.P.I. F.L. (C.C.) |
|---|---|---|---|
| Chromium ligno-sulfonate base mud | 200 | 3 | — |
| | 400 | 39 | 12.2 |
| | 425 | Too thick to measure | |
| 3 | 200 | 21 | — |
| | 400 | 5 | — |
| | 425 | 14 | 12.0 |
| 4 | 200 | 1 | — |
| | 400 | 2 | — |
| | 425 | 10 | 9.5 |

The effectiveness of Sample 4 samples prepared in accordance with the present invention, along with a commercial sample, MIL-TEMP, were also evaluated in 12 pounds per gallon water-base mud. The MIL-TEMP sample is a styrene sulfonic acid-maleic anhydride copolymer marketed by Milchem Inc. In each test, the mud was treated with 3 pounds per barrel of copolymer sample and 6 pounds per barrel of chromium-free lignosulfonate. The evaluation procedures were identical to those described in Example I. The evaluation data are listed in Table V. This table clearly indicates that the gel strengths and fluid losses of the Sample 4 treated mud system is substantially reduced when compared to that of base mud and MIL-TEMP treated systems.

TABLE V

| Sample | °F. | 10 Min. Gel. (lb/ft.²) | A.P.I. F.L. (C.C.) |
|---|---|---|---|
| Chromium-free lignosulfonate base mud | 300 | 4 | — |
| | 400 | Too thick to measure | |
| Miltemp | 300 | 4 | — |
| | 400 | 19 | 12.9 |
| 4 | 300 | 2 | — |
| | 400 | 4 | 10.0 |

The viscosity-temperature relationships for these two mud systems are demonstrated in FIGS. V and VI. The flocculating temperature for MIL-TEMP and Sample 4 are 140° F., and 310° F., respectively. The rheological behavior and thermal stability of Sample 4 are much better than that of MIL-TEMP.

These evaluation data established that the unique compositions and methods of preparation of terpolymer and graft copolymer according to the present invention provide excellent mud stabilizers and deflocculants for aqueous drilling fluids.

What is claimed is:

1. A water-soluble terpolymer having utility as a stabilizer and deflocculant for aqueous drilling fluids comprising the reaction product of:
    (a) 5 to 50% by weight of a salt of tetrahydrophthalic acid;
    (b) 10 to 70% by weight of acrylic monomer; and
    (c) 5 to 50% by weight of a salt of 2-acryl-amido-2-methylpropane sulfonic acid.

2. The water-soluble terpolymer of claim 1, wherein said acrylic monomer is selected from the group consisting of: salts of acrylic acid and methacrylic acid, acrylamide, acrylonitrile and combinations thereof.

3. A composition according to claim 1 further comprising the addition of a monovalent salt.

4. A composition according to claim 3, wherein said monovalent salt is selected from the group consisting of sodium salts, potassium salts, ammonium salts and combinations thereof.

5. A water-soluble graft copolymer having utility as a stabilizer and deflocculant for aqueous drilling fluids comprising:
    (a) 5 to 70% by weight of lignosulfonate;
    (b) 5 to 50% by weight of a salt of tetrahydropthalic acid;
    (c) 10 to 70% by weight of acrylic monomer; and
    (d) 5 to 50% by weight of a salt of 2-acryl-amido-2-methylpropane sulfonic acid.

6. The water-soluble graft copolymer of claim 5, wherein said acrylic monomer is selected from the group consisting of: salts of acrylic acid and methacrylic acid, acrylamide and acrylonitrile.

7. The water soluble graft copolymer of claim 5 wherein said lignosulfonate is a salt of a lignosulfonate.

8. The water soluble graft copolymer of claim 7 wherein said lignosulfonate salt is selected from the group consisting of the potassium salts, calcium salts, ammonium salts, sodium salts or combinations thereof.

9. The water soluble graft copolymer of claim 5 wherein said lignosulfonate is complexed with a transition metal.

10. The water soluble graft copolymer of claim 9 wherein said transition metal is selected from the group consisting of: titanium, zirconium, chromium, iron, nickel, zinc, copper and combinations thereof.

11. A method for the preparation of a terpolymer in solution, said terpolymer being characterized by a molecular weight of less than 50,000 and having utility as a stabilizer and deflocculant for aqueous drilling fluids comprising:
  (a) preparing a solution including:
    (i) 5 to 50% by weight of a salt of tetrahydrophthalic acid;
    (ii) 10 to 70% by weight of acrylic monomer; and
    (iii) 5 to 50% by weight of a salt of 2-acrylamido-2-methylpropane sulfonic acid
  (b) adding a free radical initiator to said solution; and
  (c) inducing a polymerization reaction by the addition of heat.

12. The method of claim 11 wherein said acrylic monomer is selected from the group consisting of: salts of acrylic acid and methacrylic acid, acrylamide, acrylonitrile and combinations thereof.

13. The method of claim 11 further comprising the addition of a monovalent salt.

14. The method of claim 13 wherein said monovalent salt is selected from the group consisting of sodium salts, potassium salts, ammonium salts and combinations thereof.

15. The method of claim 11 further comprising the formation of a graft co-polymer comprising the addition of 5 to 70% by weight of a lignosulfonate to said solution.

16. The method of claim 15 wherein said lignosulfonate is a salt of a lignosulfonate.

17. The method of claim 16 wherein said lignosulfonate salt is selected from the group consisting of the potassium salts, calcium salts, ammonium salts, sodium salts or combinations thereof.

18. The method of claim 15 wherein said lignosulfonate is complexed with a transition metal.

19. The method of claim 18 wherein said transition metal is selected from the group consisting of: titanium, zirconium, chromium, iron, nickel, zinc, copper and combinations thereof.

20. A method for the preparation of a graft co-polymer in solution, said co-polymer being characterized by a molecular weight of less than 50,000 and having utility as a stabilizer and deflocculant for aqueous drilling fluids comprising:
  (a) preparing a heated solution of a lignosulfonate and a free radical initiator and
  (b) adding to said heated solution:
    (i) 5 to 50% by weight of a salt of tetrahydrophthalic acid;
    (ii) 10 to 70% by weight of acrylic monomer, and
    (iii) 5 to 50% by weight of a salt of 2-acrylamido-2-methylpropane sulfonic acid.

21. The method of claim 20 wherein said lignosulfonate comprises from 5 to 70% by weight of said solution.

22. The method of claim 20 wherein said lignosulfonate is a salt of a lignosulfonate.

23. The method of claim 22 wherein said lignosulfonate salt is selected from the group consisting of the potassium salts, calcium salts, ammonium salts, sodium salts or combinations thereof.

24. The method of claim 20 wherein said lignosulfonate is complexed with a transition metal.

25. The method of claim 24 wherein said transition metal is selected from the group consisting of: titanium, zirconium, chromium, iron, nickel, zinc, copper and combinations thereof.

26. The method of claim 20 wherein the materials recited in step (b) are added as a solution to the heated solution of step (a).

27. The method of claim 20 wherein the materials recited in step (b) are added sequentially to the heated solution of step (a).

* * * * *